July 26, 1927.

H. LEITNER 1,637,224

MANUFACTURE OF SCREW PROPELLERS

Original Filed April 24, 1926

Inventor:
Henry Leitner
By George A. Prevost
Atty.

Patented July 26, 1927.

1,637,224

UNITED STATES PATENT OFFICE.

HENRY LEITNER, OF CROYDON, ENGLAND.

MANUFACTURE OF SCREW PROPELLERS.

Original application filed April 24, 1926, Serial No. 104,449, and in Great Britain July 9, 1924. Divided and this application filed December 8, 1926. Serial No. 153,411.

This invention relates to the manufacture of metal screw-propellers, primarily intended for use on aircraft, the blades of which may or may not be detachable and adjustable for pitch.

In the accompanying diagrammatic drawing.

Figure 1:
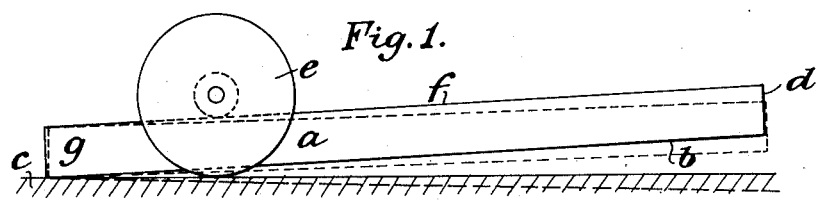
Figure 1 is a side view showing a blank for a propeller blade arranged relatively to the bed of a milling machine and cutter thereof for effecting one of the stages in the manufacture of the improved blade.
Figure 2:
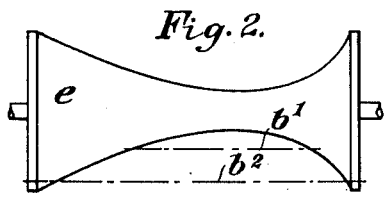
Figure 2 is a view of the cutter at right angles to that shown in Figure 1.

$a$ is the simple or composite plate or block of metal which is shaped to provide the working or acting faces of a propeller blade; for instance, the block is faced or machined flat on one side $b$, which face may or may not be parallel to the opposite face, and clamped on to the bed $c$, Figure 1, of a milling machine with the flat face downward, in such a manner that, with reference to the said flat face, the end $d$, which will ultimately be the tip of the blade, is higher than the other end by a predetermined amount. The flat face may have been previously cut on the taper relative to the other or upper face in such a way that the latter is parallel to the bed of the machine when set up. A straight cut or cuts is then taken along the length of the block with a shaped milling cutter $e$, or gang of cutters, acting on the other face $f$ of the blade, the blade being rocked longitudinally by a corresponding movement of the bed $c$ as indicated by the dotted lines in Figure 1. The milling cutter is shaped to the largest section of the finished blade, which will be located at the butt end $g$ of the blade. As many cuts as necessary are taken until the blade is of the required thickness, which thickness will vary from the butt to the tip in direct proportion to the inclination of the machined face and the rocking of the machine bed. The dot and dash lines $b^1$, $b^2$, in Figure 2, indicate, respectively, the flat face of the blade at the tip and butt.

The leading and trailing edges of the blade, or, in other words, the width of the blade, will automatically be determined by the shape of the cutter $e$ the inclination of the block and the rocking of the machine bed. Conversely the inclination of the block and rocking of the machine bed will be determined by the shape of the cutter and the widths of the blade. In either case, the blade will be shaped somewhat like the head of a lance or spear.

An alternative method to that above described is to use the same cutter as described but to cut the blade equal in width and thickness throughout its length, and then to plane the face at an inclination to the back.

Up to this stage I have produced a blade correct in section and track, but without twist, and this latter is provided by the application of a torque.

Figure 3:
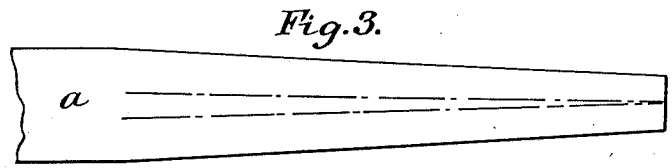
Figure 3 is a plan of a blade blank illustrating a modified stage in the manufacture and Figure 4 is a view of two milling cutters therefor.
Figure 4:
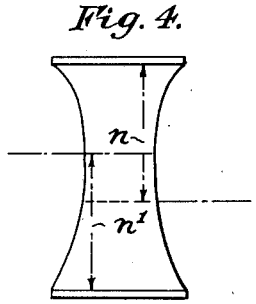

Instead of shaping the face $f$ of the blade completely at one cut as previously described, I may proceed as follows, that is to say, I make a cut or cuts in the blade with two or more cutters. As shown in Figure 4, the cutter is shaped as at $n$ to suit the leading edge and a cutter is shaped as at $n^1$ for the trailing edge of the blade, the position of the blank being re-set after the cut or cuts from one edge are made to enable the cut or cuts for the other edge to be made. The path of travel of the cutters may or may not be parallel to each other and to the centre line of the resulting blade as seen in plan view. In Figure 3, the dot and dash lines indicate two paths of the cutter out of parallelism.

An alternative method consists in the use of a single tool such as a planing or shaping tool. In this case at each successive cut, the tool must be raised or lowered, relatively to the face of the blade, in addition to being moved in a transverse direction. This setting of the tool can be arranged by a suitable cam motion or by hand.

If the other side of the blade is required to be curved, it is only necessary to reverse the blank and carry out similar operations on that side.

The rocking of the bed $c$ of the machine with the attached blade relatively to the tool, may be effected by any suitable cam motion or by hand and instead of a longitudinal direction it may be rocked in a transverse direction, or in a direction combining these two movements.

The rocking may be carried out either whilst the tool is in motion or during a temporary pause. The expression "rocking the bed" covers any movement of the work relatively to the tool other than that of feed and travel.

Figure 5:
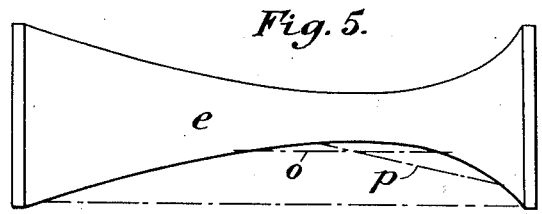
Figure 5 is a view of another milling cutter illustrating another modification in the manufacture of a propeller blade.

Instead of the straight cuts described above, I may twist or turn the blank longitudinally prior to machining, which twist would enable the most desirable part of the cutter to operate. For example, when considering the tip of the blade as cut by a single cutter $e$, as previously described with reference to Figure 1, the resultant shape is rather too thin and sharp for practical work, as indicated by the dot and dash lines $o$, Figure 5. If, however, the blank is twisted, advantage can be taken of the greater camber at one side of the cutter $e$, the side producing the leading edge of the blade, and a better section results, this being indicated by the dot and dash line $p$, Figure 5.

After one or any combination of the above operations has or have been completed, the blade is twisted to the correct helical twist as hereinbefore described and any forward rake necessary can be imparted either by a torque or by pressure, preferably, when the material is in its softest state.

Claims:

1. A process of manufacture of a screw-propeller blade from a solid block or blank of metal of approximately the shape of the blade, consisting in machining one side of the blank flat, securing the blank with the machined surface downward on the bed of a shaping machine with the end designed to form the tip of the blade higher than the other end, shaping the upper surface of the blade by cutters travelling longitudinally of the blade and at the same time rocking the blade by a corresponding movement of the machine bed.

2. A process of manufacture of a screw-propeller blade as claimed in claim 1, wherein the blade and machine bed are rocked longitudinally.

3. A process of manufacture of a screw-propeller blade as claimed in claim 1, wherein the blade and machine bed are rocked transversely.

4. A process of manufacture of a screw-propeller blade claimed in claim 1, wherein the blade and machine bed are rocked in a direction combining longitudinal and transverse movements.

5. A modification of the process claimed in claim 1, wherein the blank is twisted prior to the cutting operation to take advantage of the varying camber of the cutter, and wherein the correct twist for pitch is imparted in a subsequent operation.

6. A process of manufacture of a screw propeller blade from a solid block or blank of metal of approximately the shape of the blade, consisting in machining one side of the blank flat, securing the blank with the machined surface downward on the bed of a milling machine with the end designed to form the tip of the blade higher than the other end, shaping the upper surface of the blade by milling cutters travelling longitudinally of the blade and at the same time rocking the blade by a corresponding movement of the machine bed.

HENRY LEITNER.